(12) United States Patent
Yamamoto

(10) Patent No.: US 6,188,455 B1
(45) Date of Patent: Feb. 13, 2001

(54) LIQUID CRYSTAL DISPLAY WITH TWO OPTICAL COMPENSATION UNITS

(75) Inventor: Tsuyoshi Yamamoto, Ebina (JP)

(73) Assignee: Stanley Electric Co., Ltd., Tokyo (JP)

( * ) Notice: Under 35 U.S.C. 154(b), the term of this patent shall be extended for 0 days.

(21) Appl. No.: 09/085,655

(22) Filed: May 28, 1998

(30) Foreign Application Priority Data

Jun. 19, 1997 (JP) .................................................. 9-163142

(51) Int. Cl.[7] ............................ G02F 1/1347; G02F 1/13
(52) U.S. Cl. ............................. 349/76; 349/179; 349/181
(58) Field of Search ............................... 349/75, 76, 177, 349/178, 179, 181

(56) References Cited

U.S. PATENT DOCUMENTS

| | | | |
|---|---|---|---|
| 5,035,489 | * 7/1991 | Iijima et al. | 349/75 |
| 5,044,732 | * 9/1991 | Kimura et al. | 349/76 |
| 5,243,931 | 9/1993 | Kanemoto et al. | 349/75 |
| 5,767,937 | * 6/1998 | Sumiyoshi | 349/119 |

FOREIGN PATENT DOCUMENTS

| | | |
|---|---|---|
| 39 11 620 | 10/1990 | (DE) . |
| 0 576 931 | 1/1994 | (EP) . |
| 1-219720 | 9/1989 | (JP) . |

OTHER PUBLICATIONS

Bahadur, "Liquid Crystals Applications and Uses", vol. 3, p. 19, 1992.*

* cited by examiner

Primary Examiner—William L. Sikes
Assistant Examiner—Toan Ton
(74) Attorney, Agent, or Firm—Frishauf, Holtz, Goodman, Langer & Chick, P.C.

(57) ABSTRACT

An ECB mode liquid crystal display device in which birefringence of liquid crystal is controlled by an applied voltage. The liquid crystal display device has: a drive liquid crystal cell having a pair of substrates disposed to face each other through a predetermined gap, each substrate having an electrode on one surface thereof, and a liquid crystal layer disposed between the pair of substrates. The birefringence of the liquid crystal layer of the drive liquid crystal cell is controlled by a voltage applied between electrodes, and an optical compensation unit is disposed between the drive liquid crystal cell and one of the pair of polarizers. The optical compensation unit includes a lamination of a left-twist liquid crystal layer of liquid crystal molecules having a chirality in a left-twist direction and a right-twist liquid crystal layer of liquid crystal molecules having a chirality in a right-twist direction. With this structure optical compensation can be provided for an ECB mode liquid crystal display device capable of having a high reliability without light leakage and unnecessary coloring even in a high temperature environment.

15 Claims, 6 Drawing Sheets

LIQUID CRYSTAL DISPLAY WITH TWO OPTICAL COMPENSATION UNITS

This application is based on Japanese Patent Application No. 9-163142 filed on Jun. 19, 1997, the entire contents of which are incorporated herein by reference.

BACKGROUND OF THE INVENTION a) Field of the Invention

The present invention relates to a liquid crystal display device, and more particularly to techniques of improving the display quality of a liquid crystal display device by using optical compensation components.

b) Description of the Related Art

A liquid crystal display device having a homeotropic orientation liquid crystal cell disposed between two polarizers shows sharp threshold characteristics in an ECB (electrically controlled birefringence) mode. A high duty is therefore possible by matrix time divisional drive. However, light incidence in an oblique direction relative to the display screen of a liquid crystal display device has parasitic birefringence. Therefore, there is light transmission even without voltage application, and the contrast lowers considerably as compared to light incidence in a perpendicular direction relative to the display screen.

Figure 4:
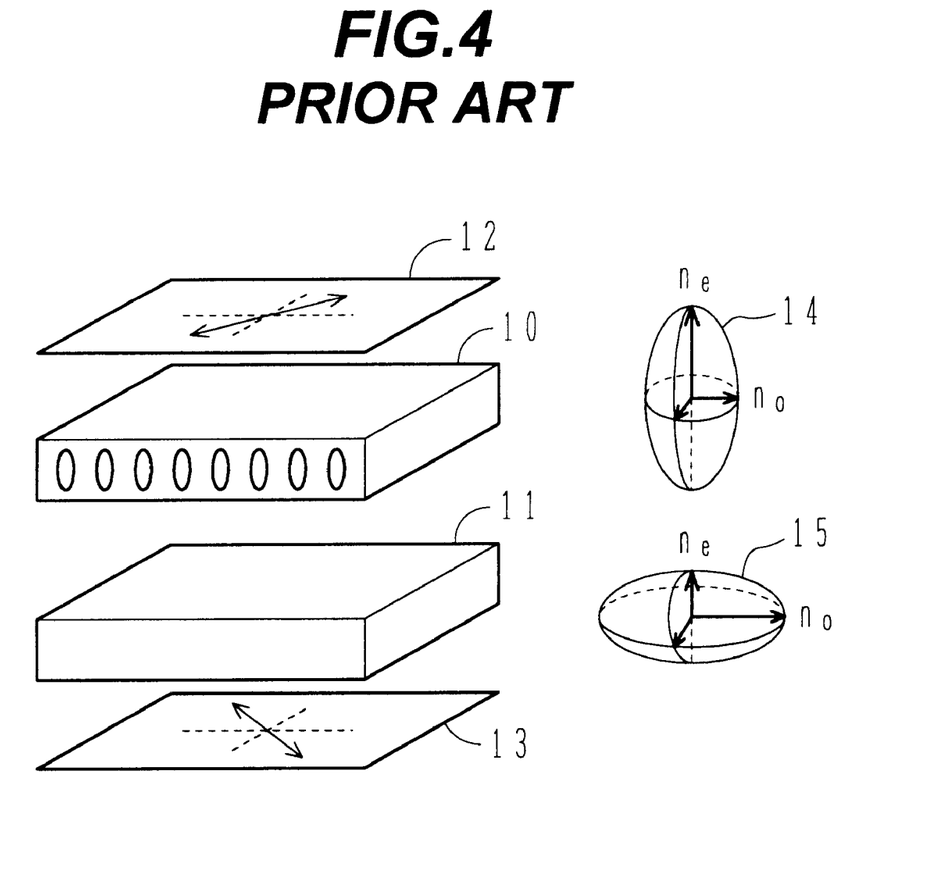
FIG. 4 is a schematic diagram showing a vertical orientation ECB mode liquid crystal display device with a conventional optical compensation film.

In order to solve this problem, optical compensation has been proposed by combining an optical compensation plate with an ECB mode liquid crystal cell as shown in FIG. 4. Reference numeral 10 represents an ECB mode liquid crystal cell which is made of nematic liquid crystal having a positive refractive index anisotropy and a negative dielectric anisotropy and being disposed generally vertical to a glass substrate surface having electrodes. Two orthogonal Nicol configuration linear polarizers 12 and 13 sandwich the ECB mode liquid crystal cell 10. When a voltage is not applied, the cell appears black, and when a voltage is applied, the cell enters a light transmission state and appears white.

An optical compensation plate 11 is inserted between the liquid crystal cell 10 and the linear polarizer 13, the optical compensation plate 11 having a negative refractive index ellipsoid indicated at 15 in FIG. 4. A combination of the positive anisotropic refractive index ellipsoid 14 of the liquid crystal cell 10 and the negative refractive index ellipsoid 15 of the optical compensation plate 11 produces optical isotropy so that the optical compensation plate 11 functions as a view angle compensator. In FIG. 4, n. represents an extraordinary ray refractive index, and no represents an ordinary ray refractive index.

Optical compensation plates having a property described above have been manufactured by the following methods.

(1) A mixture of inorganic layer compound and polymer or the like is coated on a film (JP-A-5-196819, JP-A-6-82777).

(2) Discotic liquid crystal is coated on a film.

(3) A polycarbonate film is pulled or drawn in two directions.

(4) A thermosetting film is held between two glass plates and applied with heat and pressure (JP-B-7-69536).

The films formed by the above methods are all negative uniaxial.

In an ideal case of the optical compensation plate shown in FIG. 4, a combination of the positive anisotropic refractive index ellipsoid 14 of the liquid crystal cell 10 and the negative refractive index ellipsoid 15 of the optical compensation plate 11 produces optical isotropy, and the optical compensation plate 11 functions as a view angle compensator. In this case, the negative refractive index ellipsoid 15 of the optical compensation plate 11 is required to be a negative uniaxial or biaxial refractive index ellipsoid. Optical compensation by a positive refractive index ellipsoid is impossible.

Figure 5:
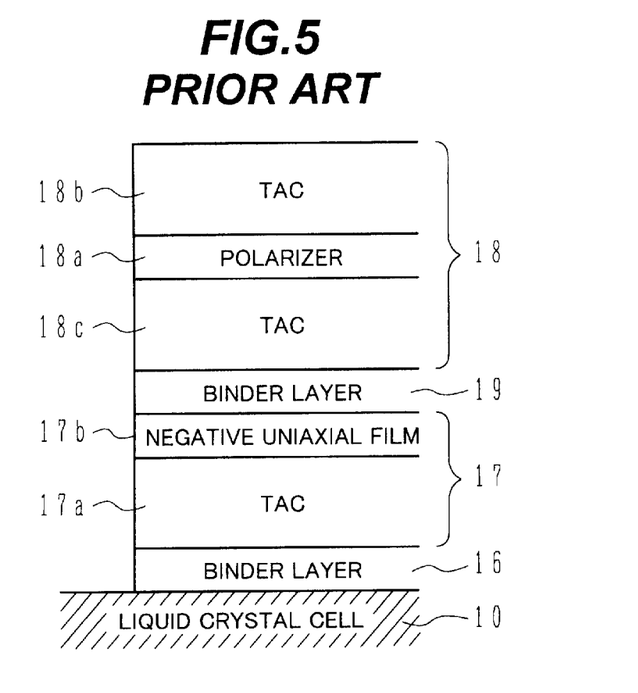
FIG. 5 is a partial cross sectional view showing a vertical orientation ECB mode liquid crystal display device with a conventional optical compensation film.

The structure of a liquid crystal display device using a conventional optical compensation plate made of films formed by either of the methods (1) and (2) will be described with reference to FIG. 5 which is a cross sectional view of a lamination structure of a liquid crystal cell, a compensation film, and a polarizer. On a liquid crystal cell 10, an optical compensation film 17 is adhered with a binder layer 16. On the optical compensation film 17, a polarizer 18 is adhered with a binder layer 19.

As a base for the polarizer 18 and optical compensation film 17, TAC (triacetate cellulose) is generally used because of a good balance between cost and performance. The polarizer 18 has a structure of a polarizer layer 18a sandwiched between a pair of TAC films 18b and 18c. The optical compensation film 17 is formed by coating a negative uniaxial film layer 17b on the surface of a base TAC film 17a.

The material of the negative uniaxial film layer 17b is an inorganic layer compound and an organic binder such as polyvinyl alcohol (PVA). Therefore, a birefringence dependency of this film 17b upon wavelength is determined by the inorganic layer compound. Generally, the refractive index dependency of an inorganic compound upon wavelength is almost constant over wavelengths of visible light rays. However, it is known that since liquid crystal is an organic compound including an aromatic compound, the refractive index greatly depends upon wavelength. Generally, both the ordinary and extraordinary ray refractive indices tend to become larger on the shorter wavelength side.

Therefore, a combination of a liquid crystal cell and a compensation plate made of an inorganic layer compound cannot realize an optical compensation uniformly over the whole range of wavelengths of visible rays. In the example described above, if the birefringence near 550 nm is optimized, a yellowish image appears on the display screen when viewed obliquely. In particular in a color display, color tone of blue becomes near achromatic color.

Figure 6A:
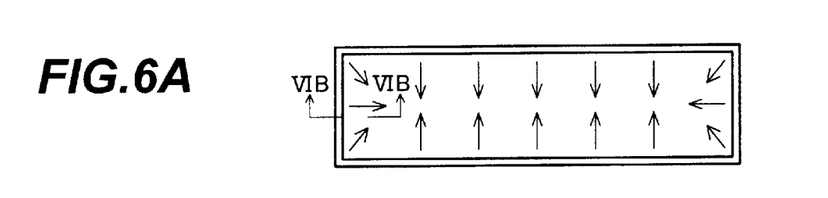
FIGS. 6A and 6B are a top view and a cross-sectional diagram Illustrating thermal shrinking of a vertical orientation ECB mode liquid crystal display device with a conventional optical compensation film.
Figure 6B:
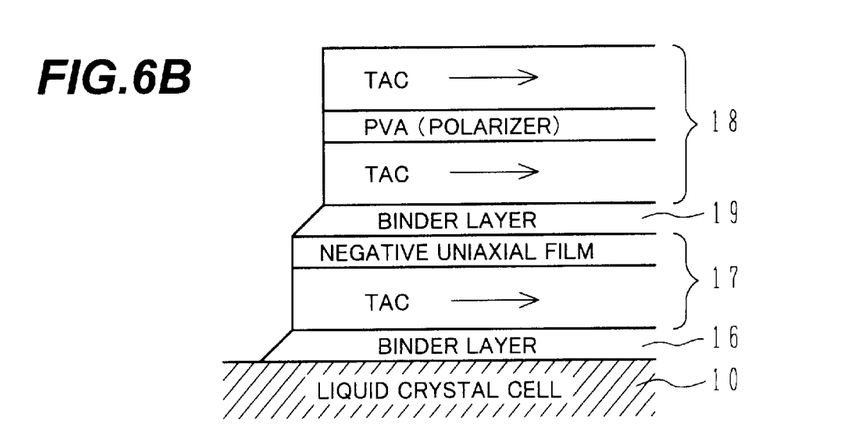

If a TAC film is exposed for a long time in an atmosphere at 60° C. or higher or in high temperature and humidity environments, the film shrinks in arrow directions as shown in FIGS. 6A and 6B and optical uniaxes are induced in the shrinking directions by a shrinking stress, independently from the optical axis inherent to the TAC film. FIG. 6A is a plan view of the TAC film, and FIG. 6B is a cross sectional view along a dotted chain line of FIG. 6A, in a liquid crystal display device as shown in FIG. 4. Optical uniaxes caused by shrinking have different directions at different areas because of different shrinking stresses in various in-plane areas, although they are influenced by the shape and size of the film. Therefore, even if the polarizer 18 is adhered in an optimum direction, there is always an in-plane area where the direction of a uniaxis is shifted from a predetermined angle to the transmission/absorption axis of the polarizer. The effects of the optical compensation plate are therefore lost, and the induced uniaxis generates birefringence and a white spot (leakage light) is formed on the display screen.

SUMMARY OF THE INVENTION

It is an object of the present invention to provide a liquid crystal display device having excellent view angle characteristics, by using an optical compensation unit having a negative refractive index ellipsoid.

It is another object of the present invention to provide a liquid crystal display device having less deterioration of a display performance even in an atmosphere at 60° C. or higher or in high temperature and humidity environments.

According to one aspect of the present invention, there is provided a liquid crystal display device comprising: a drive liquid crystal cell having a pair of substrates disposed to face each other through a predetermined gap, each substrate having an electrode on one surface thereof, and a liquid crystal layer disposed between the pair of substrates, and comprising liquid crystal molecules being controlled by a voltage applied between electrodes; a pair of polarizers disposed outside of the drive liquid crystal cell; and optical compensation means disposed between the drive liquid crystal cell and one of the pair of polarizers, wherein the optical compensation means comprises a lamination of a left-twist liquid crystal layer comprising liquid crystal molecules having a chirality in a left-twist direction and a right-twist liquid crystal layer comprising liquid crystal molecules having a chirality in a right-twist direction.

A pair of right- and left-twist cells functions as an optical compensation unit. The synthesized refractive index ellipsoid of these optical compensation ellipsoids compensates for the optical anisotropy of the refractive index ellipsoid of the drive liquid crystal cell. Chiralities of the right- and left-twist cells are cancelled out.

Optical compensation for the drive liquid crystal cell is performed by a liquid crystal structure comprising a combination of right- and left-twist liquid crystal layers. Therefore, the total refractive index ellipsoid of the compensation liquid crystal cell can be made to match the compensation for the drive liquid crystal cell.

Coloring when the display screen is viewed obliquely can be suppressed. Accordingly, a color display having a high color purity can be realized.

As compared to a conventional TAC film, since the optical compensation plate is formed by a liquid crystal structure held by substrates or by liquid crystal films, uniaxes to be caused by shrinking under a high temperature environment do not appear and light leakage does not occur. Accordingly, by properly selecting liquid crystal materials, a high reliability display device can be realized which does not degrade the optical compensation performance even in a high temperature atmosphere even higher than 100° C. or in high temperature and humidity environments. For example, a display device most suitable for being mounted in a vehicle can be formed.

DETAILED DESCRIPTION OF THE PREFERRED EMBODIMENTS

Figure 1A:
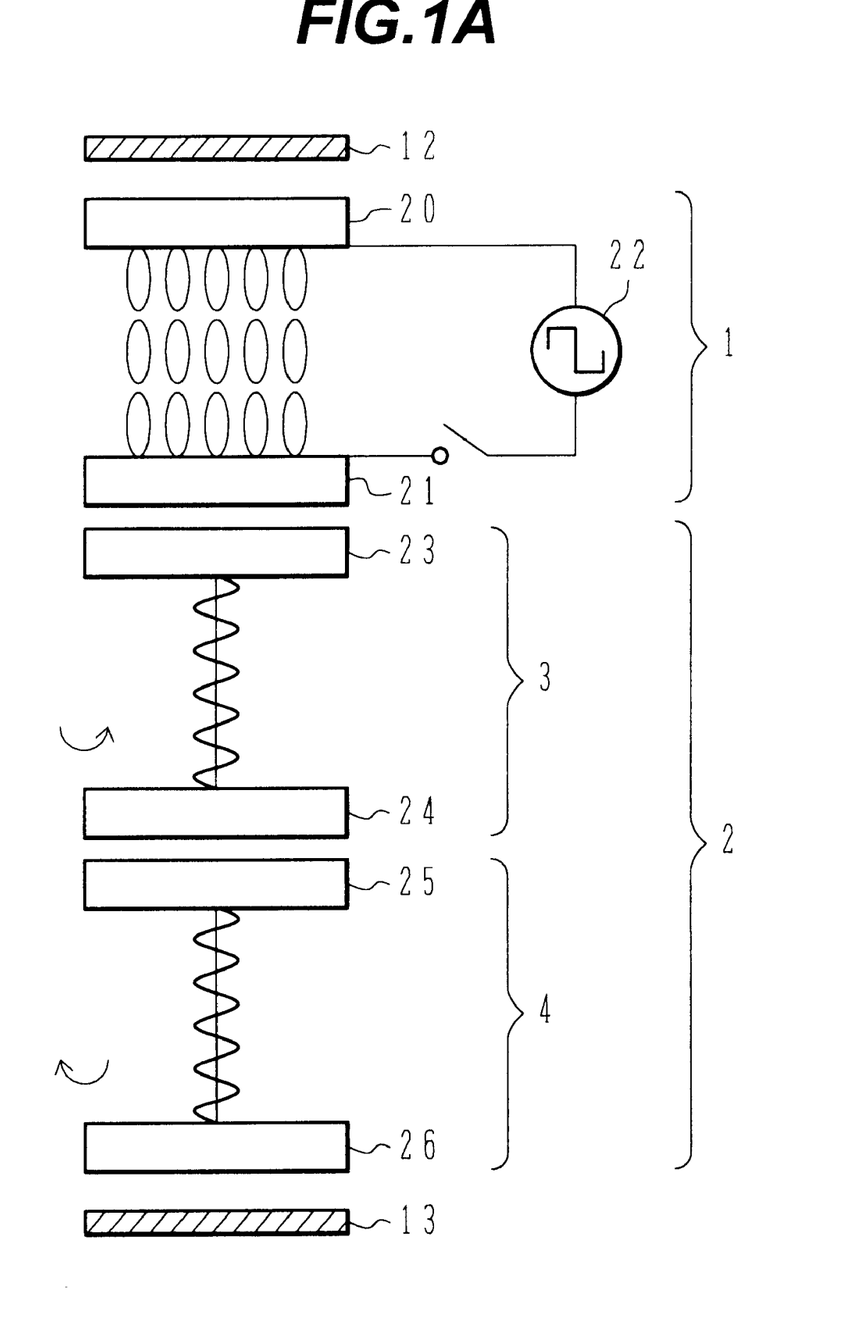
FIG. 1A is a schematic diagram showing the structure of a vertical orientation type ECB mode liquid crystal display device with optical compensation according to an embodiment of the invention.

FIG. 1A is a schematic diagram showing the structure of a vertical orientation type ECB mode liquid crystal display device according to an embodiment of the invention. In this embodiment, a liquid crystal display device is comprises a drive cell unit 1, an optical compensation unit 2, and orthogonal Nicol configuration polarizers 12 and 13.

The drive cell unit 1 has glass substrates 20 and 21 formed with electrodes, and is driven with an electrical signal supplied from a signal source to the electrodes. The drive cell unit 1 is a vertical orientation ECB mode liquid cell.

Figure 1B:
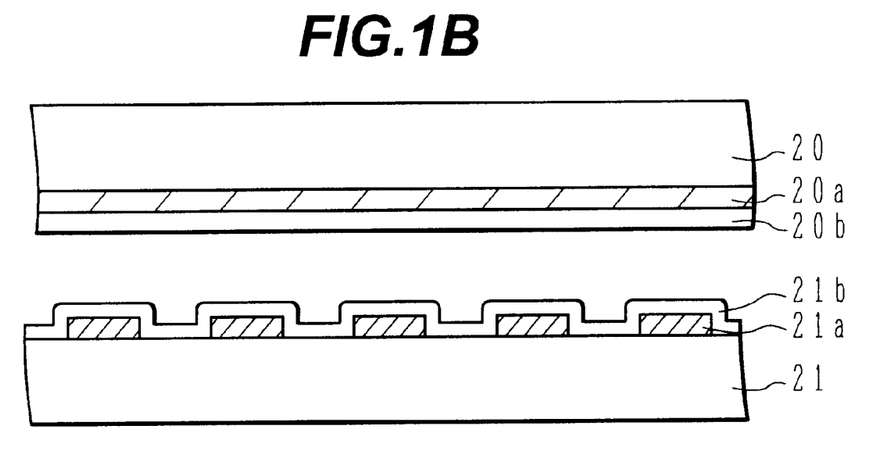
FIG. 1B a schematic cross section of a simple matrix liquid crystal display.

FIG. 1B schematically shows a structure of simple matrix liquid crystal display, wherein substrates 20 and 21 have crossing electrodes 20a and 21a covered with vertical orientation films 20b and 21b.

Figure 1C:
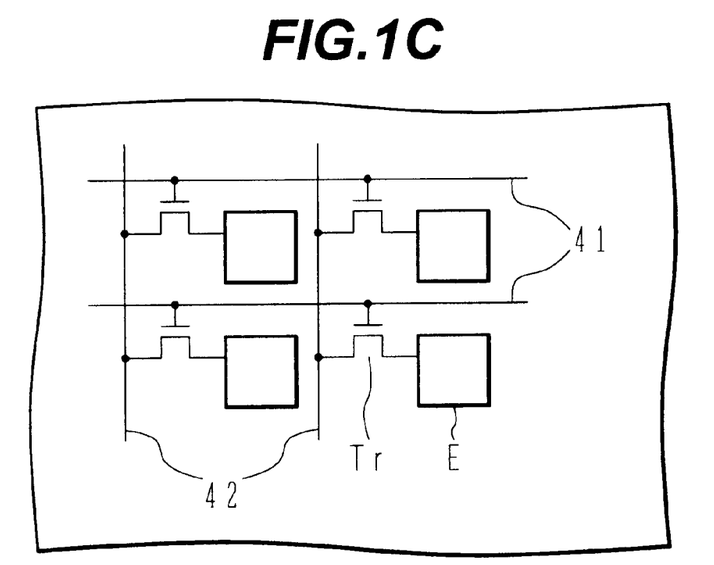
FIG. 1C schematic diagram showing an active matrix liquid crystal display.

FIG. 1C schematically shows an active matrix substrate, in which a multiplicity of pixel electrodes E are distributed in matrix form and are selectively driven by picture signals supplied from signal lines 42, through transistors Tr which are controlled by selection lines 41. In this case, the other substrate 21 has a common electrode.

The optical compensation unit 2 for performing an optical compensation (view angle compensation) for the drive cell unit 1 is made of a lamination of a horizontal orientation left-twist (counter clockwise-twist) liquid crystal cell (hereinafter called a left-twist cell) 3 and a horizontal orientation right-twist (clockwise-twist) liquid crystal cell (hereinafter called a right-twist cell) 4. In both the twist cells 3 and 4, liquid crystal molecules having a positive refractive index ellipsoid are accommodated to have predetermined twist structures.

In this embodiment, although the liquid crystal cell has a vertical orientation, it may have a pre-tilt (generally several degrees) relative to a reference normal. Namely, liquid crystal molecules are directed vertically or quasi-vertically relative to the substrate surface. The following analysis is satisfied generally even if there is a pre-tilt because this angle is small.

The left-twist cell 3 has glass substrates 23 and 24 without electrodes which sandwich liquid crystal molecules having a chirality in a left-handed screw direction. The left-twist cell 3 is a non-drive (passive or fixed) cell whose liquid crystal molecules horizontally oriented have a positive refractive index ellipsoid. Similarly, the right-twist cell 4 has glass substrates 25 and 26 without electrodes which sandwich liquid crystal molecules having a chirality in a right-handed screw direction. The right-twist cell 4 is a non-drive (passive or fixed) cell whose liquid crystal molecules horizontally oriented have a positive refractive index ellipsoid. Each glass substrate may be replaced by another transparent plate.

For general knowledge of the liquid crystal display, reference may be made to U.S. Pat. No. 5,136,407 issued on Aug. 4, 1992, U.S. Pat. No. 5,179,456 issued on Jan. 12, 1993, U.S. Pat. No. 5,171,488 issued on Dec. 15, 1992, and U.S. Pat. No. 5,479,282, issued on Dec. 26, 1995, which are incorporated herein by reference.

Parameters of each cell are defined as in Table 1. A thickness of a liquid crystal layer (cell thickness) is represented by d, and a chiral pitch inherent to liquid crystal is represented by p.

TABLE 1

| Cell | Liquid crystal refractive index anisotropy | Cell thickness | Liquid crystal chiral pitch |
|---|---|---|---|
| Drive cell | $\Delta n_n$ | $d_n$ | |
| Right-twist cell | $\Delta n_r$ | $d_r$ | $p_r$ |
| Left-twist cell | $\Delta n_l$ | $d_l$ | $p_l$ |

In this embodiment, the following conditions are required to be satisfied in order to obtain the advantageous effects of the invention.

$$\Delta n_h \cdot d_h \cong \Delta n_r \cdot d_r = \Delta n_l \cdot d_l$$

$$d_r/p_r = d_l/p_l > 0.5$$

Here, however, if the cell condition d/p is not larger than 1, a view angle compensation performance equivalent to a conventional optical compensation film is not obtained, and compensation becomes imperfect at a specific angle.

Liquid crystal molecules of the liquid crystal layers of the cells 3 and 4 have a positive refractive index ellipsoid, and are oriented horizontally. Representing the extraordinary refractive index of liquid crystal by $n_e$ and the ordinary refractive index by $n_o$, $n_e > n_o$. Therefore, the refractive index of each of the right- and left-twist cells sufficiently twisted is $(n_e + n_o)/2$ in an omnidirection in an in-plane area and $n_o$ in a thickness direction. Each of the right- and left-twist cells has therefore a negative refractive index ellipsoid.

If the material having a positive refractive index ellipsoid in an in-plane direction is used for the drive cell 1, the optical characteristics of liquid crystal molecules of the drive cell 1 cannot be compensated. However, if the drive cell 1 has liquid crystal molecules having a positive refractive index ellipsoid in a direction normal to the display screen, each twist cell can optically compensate the characteristics of the drive cell.

Optical compensation may be performed by combining the drive cell 1 with the optical compensation unit having only one of the right- and left-twist cells horizontally oriented.

However, with a combination of the drive cell and the optical compensation unit having only one of the right- and left-twist cells, rotatory polarization occurs and light transmission appears because the compensation cell is twisted. If the display screen is viewed obliquely, coloring occurs and good optical compensation is difficult.

It may be theoretically possible to eliminate such coloring, under the conditions that twist and selective scattering are not generated when light passes through the liquid crystal layer. For establishing these conditions, it is necessary to shorten at least the twist pitch of liquid crystal less than light wavelength. Since the wavelength of visible light ray is in a range from 400 to 700 nm, it is necessary to set d/p larger than 10 assuming that the liquid crystal thickness d is 4 microns.

If a value of d/p is in a range from 1 to 10, the twist pitch of liquid crystal is not sufficiently shorter than light wavelength. In the case of the liquid crystal display device comprises one optical compensation plate and a liquid crystal cell, linearly polarized light passed through one polarizer enters the twist cell and circularly or elliptically polarized by the twist of the twist cell. Therefore, coloring caused by the refractive index anisotropy dependency on wavelength cannot be eliminated even if the other polarizer is disposed in whatever direction. The liquid crystal display device has therefore poor contrast.

If the value of d/p is set larger than the order of 10, the twist pitch of liquid crystal becomes shorter than light wavelength so that coloring can be eliminated theoretically. However, as the d/p value is set larger and the number of twists is increased, it becomes likely to form domains having different twist numbers to be caused by spacers or the like used for controlling the liquid crystal cell thickness precisely and uniformly, and the liquid crystal cell has display defects such as optically discontinuous visual lines. According to the experiments made by the inventor, it is difficult to stably obtain a uniform display device if the d/p value is set larger than 10.

If the d/p value is set around 1, 2, or 3 (integer value), the distribution of refractive index ellipsoids of the compensation cell changes uniform in in-plane directions, satisfying the compensation conditions of the drive cell. However, in practice, good experiment results were not obtained. The reason for this may be ascribed to the following. Liquid crystal molecules of the compensation cell have a tilt angle at the interface between the glass plate and liquid crystal molecules, and have a larger tilt angle in the central region in the thickness direction of the compensation cell. These tilt angles affect the compensation cell and its chirality does not disappear. Therefore, with the drive cell sandwiched between orthogonal Nicol configuration linear polarizers, strong light transmission is produced when viewed normal to the display screen.

In the first embodiment of the invention shown in FIG. 1A, the optical compensation unit 2 is comprises a pair of the left- and right-twist cells 3 and 4 having similar performances. Therefore, the chiralities of the compensation cells are cancelled out so that the remaining intrinsic characteristics of the uniaxial optical medium can be effectively utilized.

The following experiment results were obtained under the above-described conditions $d_r/p_r = d_l/p_l$ by changing the d/p values of the right- and left-twist cells.

(1) At the d/p value in a range from 0.5 to 1, a view angle compensation in a specific direction is possible although the compensation performance of the drive cell is not perfectly sufficient.

(2) At the d/p value in a range from 1 to 2, coloring occurs in a specific direction. The reason that a compensation performance changes direction may be ascribed to the fact that a synthesized refractive index ellipsoid of the positive refractive index ellipsoids of the right- and left-twist cells horizontally oriented is not an uniaxial refractive index ellipsoid but a biaxial refractive index ellipsoid. In other words, there is birefringence and dependence upon wavelength. p (3) At the dip value larger than 2, the compensation performance is roughly good. At the d/p value of 3 or larger, the compensation performance is almost perfect. This may be considered as resulting from the fact that a synthesized refractive index ellipsoid becomes more uniaxial as the d/p value is made larger.

At the d/p value of 6 or larger, a schliren region starting from a spacer for maintaining the gap between a pair of glass substrate of the liquid cell, or from other positions, is observed. This schliren region is likely to form a domain at the d/p value of 10 or larger, so that a uniform compensation cell is difficult to obtain. From the practical viewpoint, a good optical compensation cell with a large area and a uniform quality cannot be obtained at the d/p value larger than 10.

In the first embodiment of the invention described above, the optical compensation unit is comprises a pair of left- and right-twist cells 3 and 4 each sandwiched between a pair of glass substrates. Instead of such compensation cells, liquid crystal films may be used.

A second embodiment of the invention will be described with reference to FIGS. 2 and 3. In this embodiment, a film with a right-twist liquid crystal layer and a film with a left-twist crystal layer are laminated to form the optical compensation unit combined with the drive cell 1. Similar advantageous effects to the first embodiment are obtained also in the second embodiment.

Figure 2:
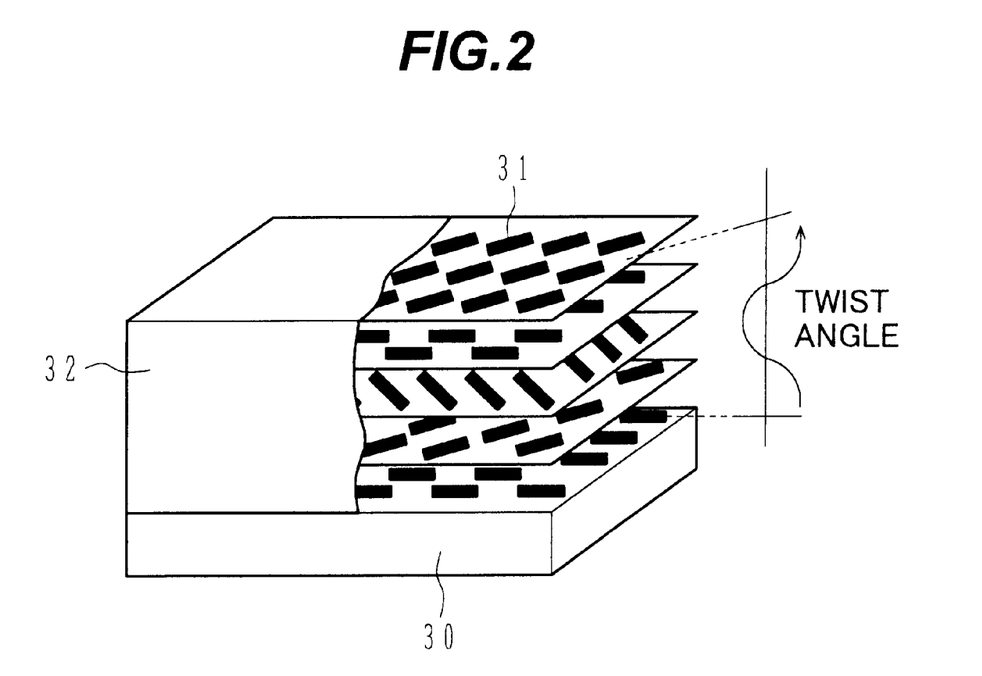
FIG. 2 is a perspective view schematically showing the structure of a liquid crystalline polymer film.

FIG. 2 is a perspective view illustrating the structure of a liquid crystal film, for example, a NISSEKI LC film (registered trademark) manufactured by NIPPON OIL CO., LTD. As shown, an LC film has a liquid crystalline polymer layer 32 coated on a transparent film base 30. The liquid crystalline polymer layer 32 is made of liquid crystal layer 31 with a twist pitch of liquid crystal molecules being adjusted to a desired value.

Figure 3:
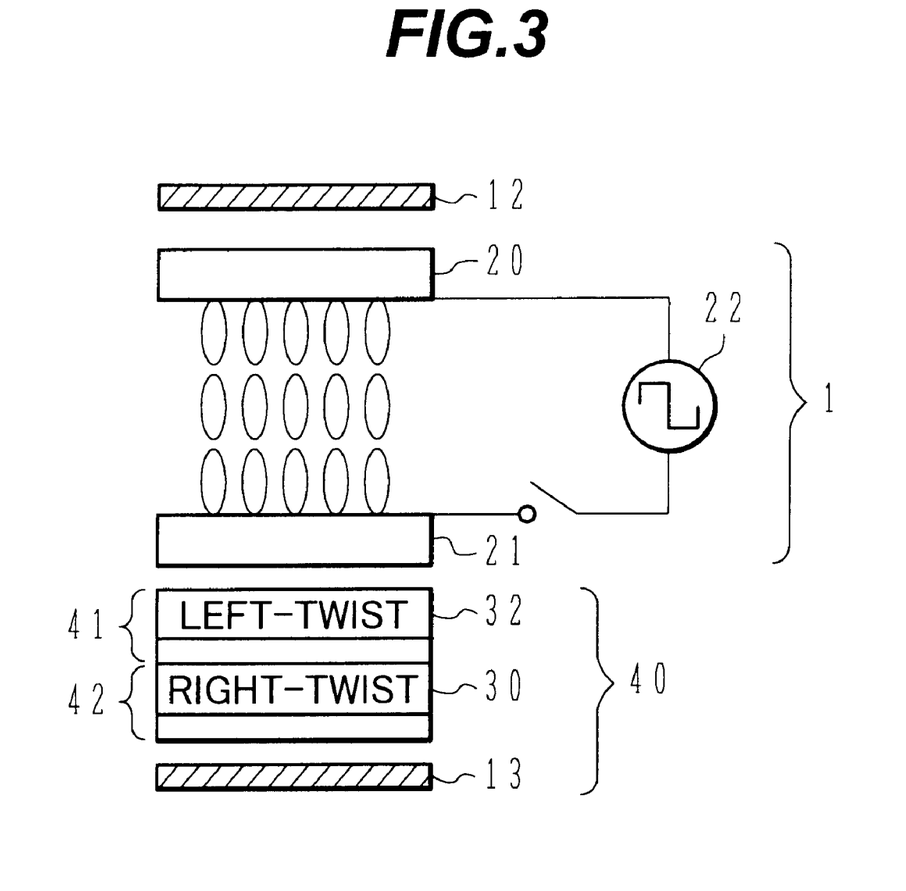
FIG. 3 is a schematic diagram showing a vertical orientation ECB mode liquid crystal display device with a liquid crystalline polymer film added thereto.

The liquid crystal display device of the second embodiment shown in FIG. 3 is a vertical orientation type ECB mode liquid crystal display device which includes an optical compensation unit 40 and a drive cell unit 1 which is similar to the first embodiment shown in FIG. 1. The optical compensation unit 40 is made of a lamination of films 41 and 42. The film 41 has a coated left-twist liquid crystalline polymer layer with an adjusted p/d value, and the film 42 has a coated right-twist liquid crystalline polymer layer with an adjusted p/d value. One polarizer 13 may be bonded to one surface of the optical compensation unit 40 by using adhesive agent.

The number of film layers bonded to the surfaces of a liquid crystal cell is preferably as small as possible in order to avoid shrinking of films in a high temperature environment. Therefore, the liquid crystalline polymer layer 32 may be formed directly on the outer surface of the glass substrate 21 of the drive liquid crystal cell 1. A good compensation performance of the compensation films of the second embodiment is obtained similar to the first embodiment, if the d/p values is set to 2 or larger.

In the case of a liquid crystalline polymer film, there is no problem of a domain as in the first embodiment at the d/p value of 10 or larger. Therefore, the optical compensation unit may be formed by using only one of right- and left-twist liquid crystalline polymer layers having a large d/p value. However, in order to form a liquid crystalline polymer layer having a stable twist angle, it is desired to set the d/p value smaller. In practical use, if the d/p value is set higher than about 4, the central axis of twist may shift and a stable manufacture tends to become difficult. Therefore, the d/p value is preferably $2 \leq d/p \leq 4$ in order to form a lamination of right- and left-twist liquid crystal polymer layers stably.

In the first and second embodiments, a vertical orientation type ECB mode liquid crystal display device is used. The invention is also applicable to a TN (twist nematic) type liquid crystal display device.

A TN type liquid crystal display device has a d/p value of 0.25 in order to give a twist angle of 90°. Light extinction is established by aligning the orientation axis direction with the transmission or absorption axis of the polarizer. Liquid crystal molecules have a pre-tilt, and nematic liquid crystal with a positive dielectric anisotropy has a refractive index anisotropy dependency upon wavelength. For example, if the twist pitch of a liquid crystal cell becomes longer than light wavelength, light is circularly or elliptically polarized. Therefore, also with the liquid crystal display device of this mode, a coloring problem occurs when the display screen is observed obliquely.

Similar to the above-described embodiments, this coloring problem is solved by using an optical compensation unit having right- and left-twist liquid crystal layers.

In the case of a TN type liquid crystal display device, particularly a device with homogeneous orientation, liquid crystal molecules are aligned along a thickness direction, posing a problem similar to the ECB mode liquid crystal display device, under the conditions that a transmission state of normally white is set when a voltage is not applied and that a high voltage ensuring a high contrast is applied to the liquid crystal to have almost homeotropic orientation of liquid crystal molecules applied with the voltage.

In such a case, the optical compensation unit having right- and left-twist liquid crystal layers is used to reduce the view angle dependency of the liquid crystal layer portion applied with a voltage. In this manner, a broad view angle can be obtained and a high contrast liquid crystal display device without coloring can be formed.

The present invention has been described in connection with the preferred embodiments. However, the invention is not limited only to the above embodiments and it should be is apparent that various modifications, improvements, combinations, and the like can be made by those skilled in the art.

What is claimed is:

1. A liquid crystal display device comprising:
   a drive liquid crystal cell having a pair of substrates disposed to face each other with a predetermined gap therebetween, and a liquid crystal layer disposed between the pair of substrates, wherein each substrate has an electrode on one surface thereof and liquid crystal molecules of the liquid crystal layer are controlled by a voltage applied between the electrodes;
   a pair of polarizers disposed outside of said drive liquid crystal cell; and
   an optical compensation unit disposed between said drive liquid crystal cell and one of the pair of polarizers;
   wherein said optical compensation unit comprises a left-twist liquid crystal layer of liquid crystal molecules having a chirality in a left-twist direction and a right-twist liquid crystal layer of liquid crystal molecules having a chirality in a right-twist direction;
   wherein: $d_r/P_r=d_l/P_l$, where $P_r$ is a chiral patch and $d_r$ is a thickness, respectively, of the right-twist liquid crystal layer, and $P_l$, is a chiral pitch and $d_l$ is a thickness, respectively, of the left-twist liquid crystal layer;
   wherein $\Delta n_h \cdot d_h \cong \Delta n_l \cdot d_l = \Delta n_r \cdot d_r = \Delta n_l$, and $d_r/p_r=d_l/p_l>0.5$, where $\Delta n_h$, $\Delta n_l$ and $\Delta n_r$ are values of refractive index anisotropies, respectively, of said drive liquid crystal cell, said left-twist liquid crystal layer and said right-twist liquid crystal layer, and $d_h$ is a thickness of said drive liquid crystal cell.

2. The liquid crystal display device according to claim 1, wherein the left-twist liquid crystal layer and the right-twist liquid crystal layer of the optical compensation unit are sandwiched between glass substrates.

3. The liquid crystal display device according to claim 1, wherein at least one of the left-twist liquid crystal layer and the right-twist liquid crystal layer is coated on a transparent film base to form a compensation plate.

4. The liquid crystal display device according to claim 3, wherein the left-twist liquid crystal layer and the right-twist liquid crystal layer are laminated one on another on the transparent film base to form the compensation plate.

5. The liquid crystal display device according to claim 1, wherein the optical compensation unit comprises a lamination of the left-twist liquid crystal layer and the right-twist liquid crystal layer.

6. The liquid crystal display device according to claim 5, wherein one of the polarizers is bonded to a surface of the optical compensation unit.

7. The liquid crystal display device according to claim 1, wherein at least one of the left-twist liquid crystal layer and the right-twist liquid crystal layer of the optical compensation unit is bonded to an outer surface of one of the substrates of the drive liquid crystal cell.

8. The liquid crystal display device according to claim 1, wherein the left-twist liquid crystal layer and the right-twist liquid crystal layer of the optical compensation unit are laminated one on another on an outer surface of one of the substrates of the drive liquid crystal cell.

9. The liquid crystal display device according to claim 8, wherein one of the polarizers is bonded to a surface of the laminated left-twist and right-twist liquid crystal layers.

10. The liquid crystal display device according to claim 1, wherein the chiral pitches and thicknesses of the left- and right-twist crystal layers satisfy $d_r/p_r = d_l/p_l > 3$.

11. The liquid crystal display device according to claim 10, wherein the chiral pitches and thicknesses of the left- and right-twist crystal layers satisfy $d_r/p_r = d_l/p_l < 10$.

12. The liquid crystal display device according to claim 1, wherein the liquid crystal layer of said drive liquid crystal cell is an ECB mode liquid crystal cell comprising liquid crystal molecules oriented vertically or quasi-vertically relative to the surface of one of the substrates when no voltage is applied.

13. The liquid crystal display device according to claim 12, wherein the liquid crystal layer of said drive liquid crystal cell contains nematic liquid crystal material having a negative dielectric anisotrophy.

14. The liquid crystal display device according to claim 1, wherein said optical compensation unit further comprises a pair of glass substrates disposed to face each other, with the left-twist liquid crystal layer and the right-twist liquid crystal layer disposed between the glass substrates.

15. The liquid crystal display device according to claim 1, wherein the left-twist liquid crystal layer and the right-twist liquid crystal layer each comprise a polymer liquid crystal layer.

* * * * *